(12) United States Patent
Schamberger et al.

(10) Patent No.: US 9,270,152 B2
(45) Date of Patent: Feb. 23, 2016

(54) ELECTRIC AUGER

(71) Applicant: ARDISAM, INC., Cumberland, WI (US)

(72) Inventors: Randy Schamberger, Cumberland, WI (US); Michael Avery, Cumberland, WI (US); Robert Ruppel, Cumberland, WI (US); David Hare, Cumberland, WI (US)

(73) Assignee: Ardisam, Inc., Cumberland, WI (US)

( * ) Notice: Subject to any disclaimer, the term of this patent is extended or adjusted under 35 U.S.C. 154(b) by 400 days.

(21) Appl. No.: 13/771,580

(22) Filed: Feb. 20, 2013

(65) Prior Publication Data

US 2014/0174824 A1   Jun. 26, 2014

Related U.S. Application Data

(60) Provisional application No. 61/745,961, filed on Dec. 26, 2012.

(51) Int. Cl.
*E21B 7/00* (2006.01)
*H02K 7/14* (2006.01)

(52) U.S. Cl.
CPC .............. *H02K 7/145* (2013.01); *E21B 7/005* (2013.01)

(58) Field of Classification Search
USPC ..................................... 175/18; 310/50; 76/2
See application file for complete search history.

(56) References Cited

U.S. PATENT DOCUMENTS

| 4,488,605 A | 12/1984 | Ruppel et al. |
| 7,946,355 B1 | 5/2011 | Kluge |
| 2005/0000736 A1* | 1/2005 | Maki .............................. 175/394 |
| 2005/0099150 A1* | 5/2005 | Nicholson ...................... 318/469 |
| 2005/0144801 A1* | 7/2005 | Wilson .............................. 34/60 |
| 2005/0205198 A1 | 9/2005 | Presti et al. |
| 2009/0187277 A1* | 7/2009 | Bird-Radolovic et al. ... 700/245 |
| 2010/0074702 A1 | 3/2010 | Kluge |
| 2011/0174561 A1* | 7/2011 | Bowman .................. 180/65.245 |

FOREIGN PATENT DOCUMENTS

| KR | 20-2008-0005875 | 12/2008 |
| WO | WO2006/062453 | 6/2006 |

OTHER PUBLICATIONS

International Search Report and Written Opinion of the International Bureau of WIPO for International Application No. PCT/US2011/055677; Jan. 9, 2014; 7 pgs.
Icegator Innovations, Online Products Brochure; icegator.com (4 pgs.).
StrikeMaster Electra Lazer, Online Order Form; strikemaster.com (2 pgs.).

* cited by examiner

*Primary Examiner* — Taras P Bemko
(74) *Attorney, Agent, or Firm* — Stoel Rives LLP

(57) ABSTRACT

An electric auger including an auger assembly with a coupling assembly at a proximal end, a cutting assembly having at least one cutting blade located at a distal end, and a helical flight located between the proximal end and the distal end. The electric power head includes an A/C motor with a drive shaft configured to mechanically couple with the proximal end of the auger assembly. An on-board 36-volt DC battery pack powers the A/C motor. A controller includes an inverter that converts DC power to A/C power for the A/C motor. The ratio of cubic inches of ice cut per battery ampere-hour per weight in pounds of the electric auger is at least about 900 ($inches^3$/ampere-hour/pounds).

18 Claims, 4 Drawing Sheets

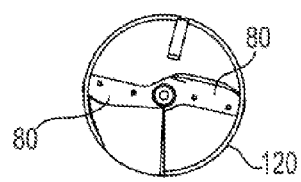
Fig. 4B
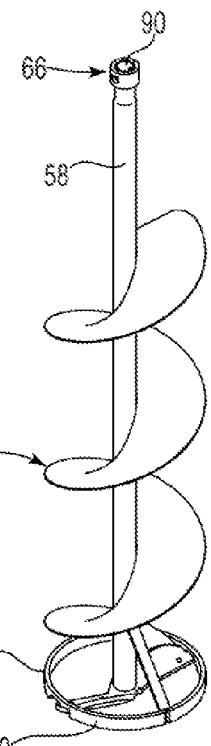
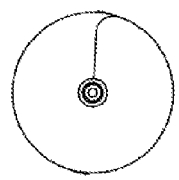
Fig. 4C
Fig. 4A
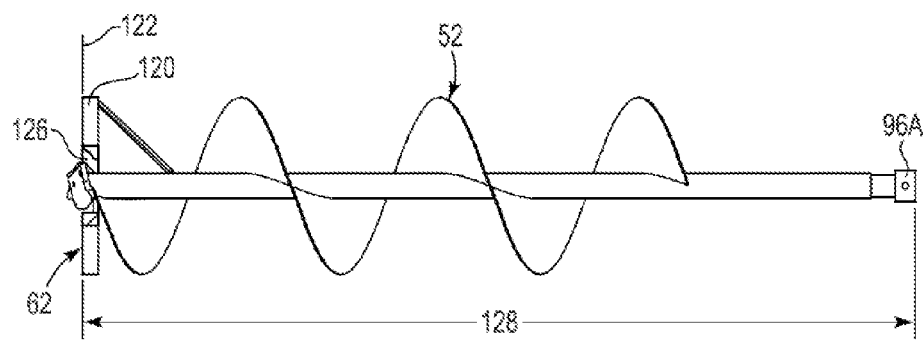
Fig. 4D

ELECTRIC AUGER

RELATED APPLICATIONS

The present application claims the benefit of U.S. Provisional Application No. 61/745,961 entitled ELECTRIC AUGER, filed Dec. 26, 2012, the entire disclosures of which are hereby incorporated by reference.

TECHNICAL FIELD

The present disclosure is directed to an electric ice auger that provides superior cutting capacity per battery ampere-hour per weight of the ice auger/power head.

BACKGROUND OF THE DISCLOSURE

Augers are used to drill narrow holes, such as through ice for ice fishing or in the earth for setting posts. A typical auger has one or more boring blades at the lower end of an upright drive shank and a spiral flight extending from the boring blades up a lower portion of the drive shank. The drive shank is rotated to turn the blades to bore a hole, such as through the ice. Some augers are manual, such that the drive shank is rotated manually, by an operator turning a crank. Other augers are powered, such that the drive shank is rotated by an electric motor or fuel-powered engine.

U.S. Pat. Publication 2010/0074702 discloses a spindle coupling that connects a cordless DC electric motor to an auger assembly to drill holes in ice. The DC motor is powered by a removable 36 V lithium battery.

An electric ice auger sold by Icegator, LLC located in Pettisville, Ohio under the trade name "Icegator Annihilator" uses a sealed and insulated 36 volt Li-Ion battery pack that just plugs in and can be charged on or off the power head. The power head and battery pack weighs about 22 pounds and turns at 385 rpm at the cutting edge. The manufacturer claims that the power head can cut over 40 holes through 28" of ice on a single charge with certain bits.

Another electric ice auger sold under the trade name "Electra Lazer 12000 DP Power Auger", available from assignee of the present application, includes an on-board 12 volt battery pack and extension cables to attach to a separate power source, such as for example, a car battery. The power head and battery pack weights about 20.79 pounds and turns at about 90 rpm.

BRIEF SUMMARY OF THE DISCLOSURE

The present disclosure is directed to an electric ice auger with a 36 volt battery pack and an A/C brushless motor that provides substantially less weight and superior cutting capacity per battery ampere-hour per weight of the ice auger/power head.

One embodiment is directed to an electric auger including an auger assembly and a power head. The auger assembly includes a coupling assembly at a proximal end, a cutting assembly having at least one cutting blade located at a distal end, and a helical flight located between the proximal end and the distal end. The power head includes an A/C motor with a drive shaft configured to mechanically couple with the proximal end of the auger assembly. An on-board 36-volt DC battery pack powers the A/C motor. An inverter converts DC power to A/C power for the A/C motor. The ratio of cubic inches of ice cut per battery ampere-hour per weight in pounds of the electric auger is at least about 900 (inches$^3$/ampere-hour/pounds).

In one embodiment, the power head and battery pack weighs about 12 pounds. The entire ice auger preferably weights about 14 pounds. The battery pack is preferably removable.

A direct drive system preferably couples the A/C motor to the auger assembly. The direct drive system is optionally a planetary gear transmission. A thermal cut-out switch is provided to terminate power flow to the A/C motor if battery temperature exceeds a predetermined threshold. The controller is preferably programmed to stop the A/C motor if torque, current, or temperature exceeds predetermined thresholds. In another embodiment, the controller is programmed to create a delay between activation of a power switch and activation of the A/C motor. The controller preferably regulates operation of the A/C motor to provide a maximum torque and an operating torque.

In one embodiment, the ratio of cubic inches of ice cut per battery ampere-hour per weight of the electric auger in pounds is at least about 1000 (inches$^3$/ampere-hour/pounds). In another embodiment, the ratio of cubic inches of ice cut per battery ampere-hour per weight of the power head in pounds is at least about 1200 (inches$^3$/ampere-hour/pounds).

The present disclosure is also directed to an electric power head for rotating an auger assembly of an ice auger. The electric power head includes an A/C motor with a drive shaft configured to mechanically couple with the auger assembly. An on-board 36-volt DC battery pack is provided. A controller converts DC power from the battery pack to A/C power for the A/C motor. The ratio of cubic inches of ice cut per battery ampere-hour per weight in pounds of the electric power head is at least about 900 (inches$^3$/ampere-hour/pounds).

The present disclosure is also directed to a method of operating an electric auger. The method includes attaching an auger assembly to a drive shaft of an A/C motor located in a power head. Power from a 36-volt, on-board DC battery pack is converted to 36 volt, 120 Hz alternating current. The A/C motor is powered by the 36 volt, 120 Hz alternating current. At least one rotating cutting blade located at a distal end of the auger assembly is engaged with ice. The ratio of cubic inches of ice cut per battery ampere-hour per weight of the electric auger in pounds is at least about 900 (inches$^3$/ampere-hour/pounds).

The method includes directly coupling the A/C motor to the auger assembly. The method includes terminating power flow to the A/C motor if battery temperature exceeds a predetermined threshold. In another embodiment, the method includes stopping the A/C motor if torque, current, or temperature exceeds predetermined thresholds. The controller is preferably programmed to create a delay between activation of a power switch and activation of the A/C motor. The method further includes regulating operation of the A/C motor to provide a maximum torque and an operating torque.

Additional aspects and advantages will be apparent from the following detailed description of preferred embodiments, which proceeds with reference to the accompanying drawings.

BRIEF DESCRIPTION OF THE DRAWINGS

FIG. 4A is a perspective view of an auger assembly in accordance with an embodiment of the present disclosure.

FIG. 4B is bottom view of the auger assembly of FIG. 4A.

FIG. 4C is a top view of the auger assembly of FIG. 4A.

FIG. 4D is a side view of the auger assembly of FIG. 4A.

DETAILED DESCRIPTION OF PREFERRED EMBODIMENTS

Figure 1:
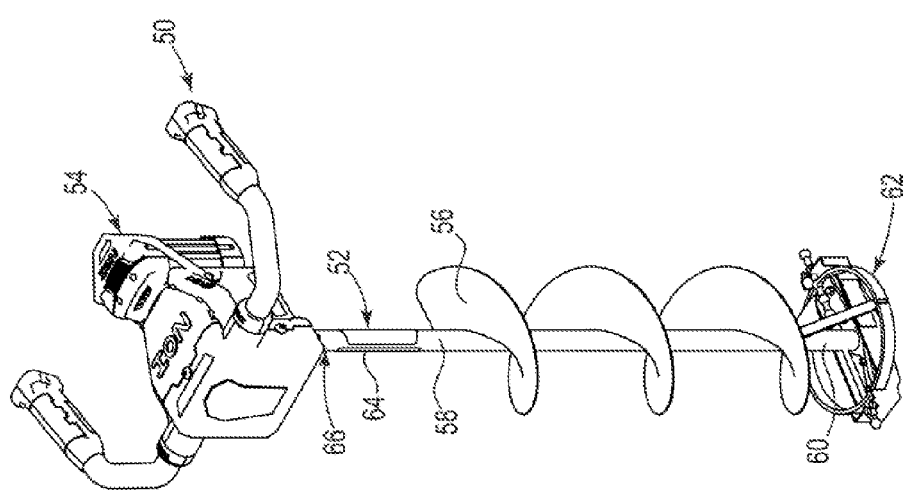
FIG. 1 is a perspective view of an electric auger according to an embodiment of the present disclosure.

FIG. 1 is a perspective view of one embodiment of a lightweight electric auger 50 in accordance with an embodiment of the present disclosure. The electric auger 50 includes an auger assembly 52 and power head 54. The auger assembly 52 is removable and available in different diameters, such as for example, six inch, eight inch or ten inch.

The auger assembly 52 includes a continuous helical flight 56 secured to central member 58, typically by welding. The member 58 is preferably a hollow tube to reduce weight. Distal end 60 of the helical flight 56 includes cutting assembly 62, discussed in greater detail herein. Proximal end 64 of the central member 58 includes coupling assembly 66 configured to releasably attach to shaft 58 on the power head 54 (see FIG. 3).

The power head 54 includes removable, on-board battery pack 70 and handles 72. Battery retainer 74 is pivotally attached to housing 76 to secure the battery pack 70 to the power head 54. Handles 72 include one or more triggers 78 used to activate the power head 54.

Figure 2:
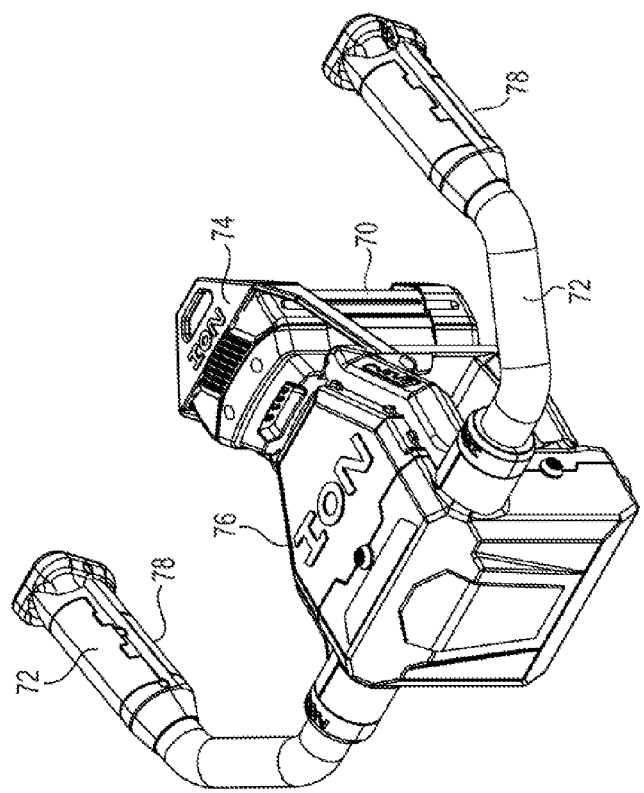
FIG. 2 is a perspective view of a power head for the electric auger of FIG. 1.
Figure 3:
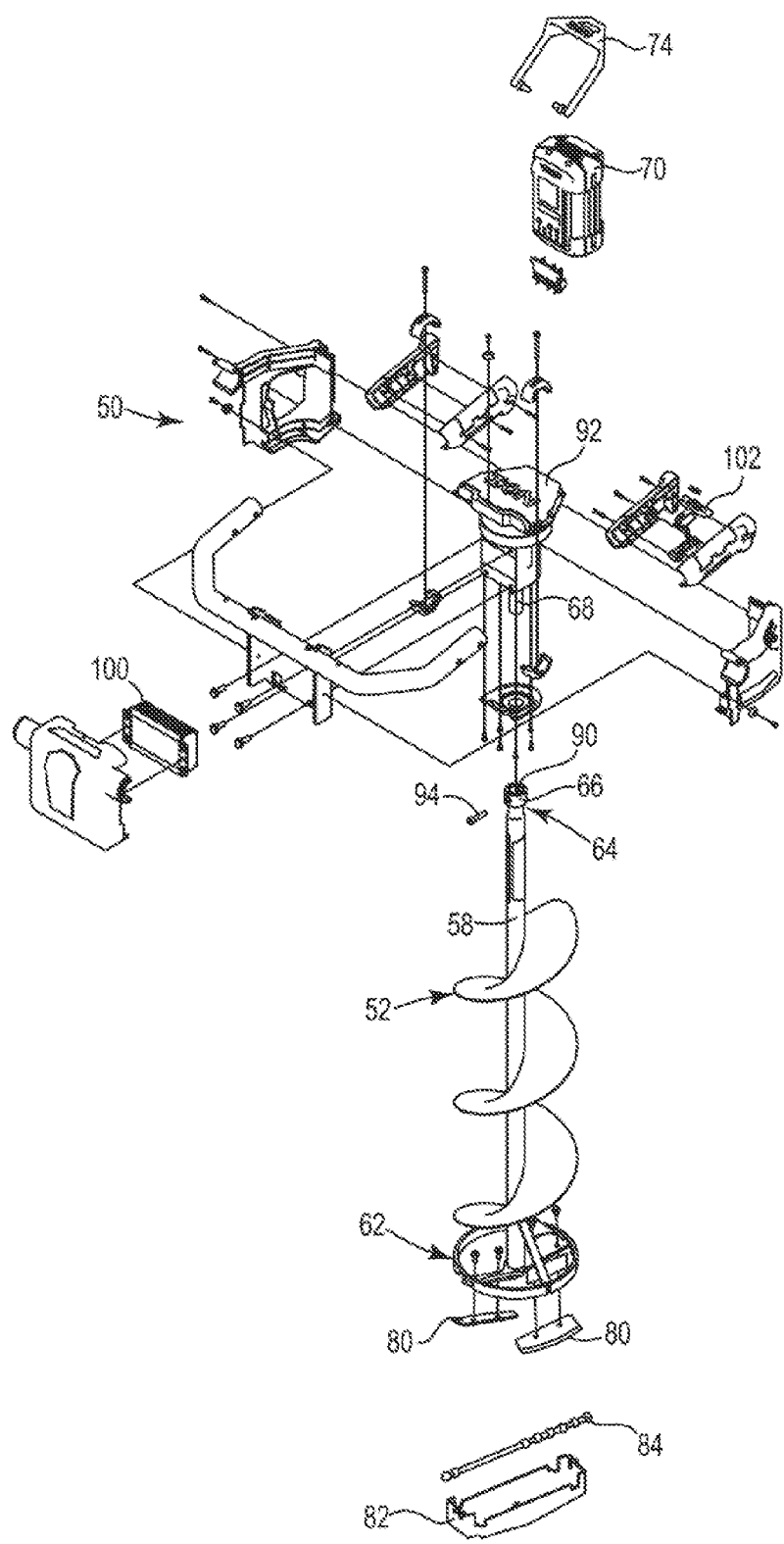
FIG. 3 is an exploded view of the electric auger of FIG. 1.
Figure 5A:
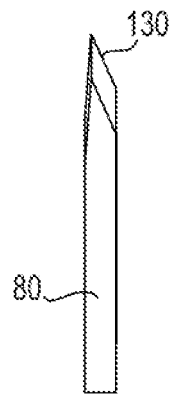
FIG. 5A is a side view of a cutting blade for an auger assembly in accordance with an embodiment of the present disclosure.
Figure 5B:
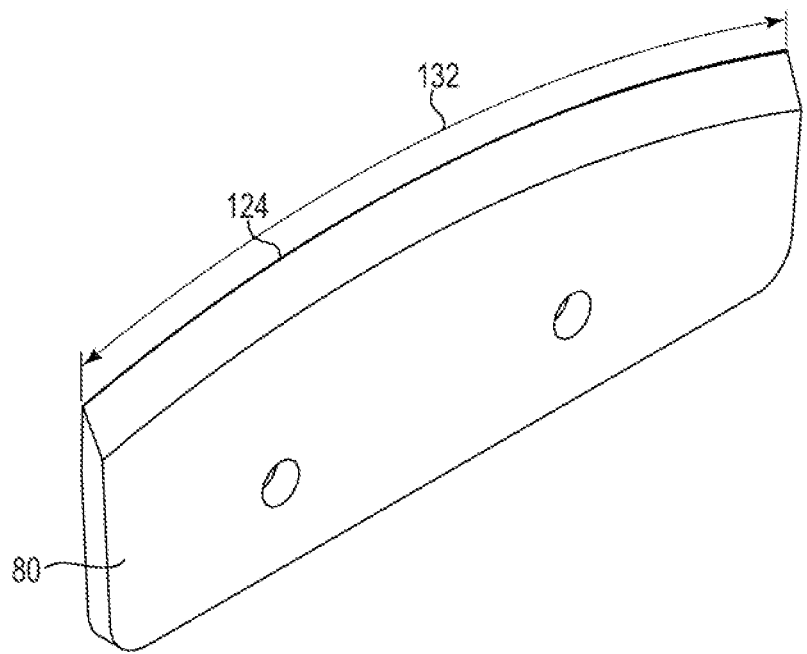
FIG. 5B is a perspective view of the cutting blade of FIG. 5A.

FIG. 3 is an exploded view of the electric auger 50 of FIGS. 1 and 2. The cutting assembly 62 of the auger assembly 52 includes one or more removable cutting blades 80. Additional detail of the auger assembly 52 is provided in connection with FIGS. 4 and 5. Optional plastic covering 82 extends over the cutting blades 80 when attached to the cutting assembly 62 with elastic member 84.

The coupling assembly 66 includes recess 90 (see FIG. 4A) in proximal end 64 of the tubular member 58 configured to engage with shaft 68 on motor assembly 92. Shear pin 94 extends through holes 96A, 96B in the coupling assembly 66 and the shaft 68 to fix the coupling assembly 66 to the power head 54. The shear pin 94 is designed to fail if torque between the auger assembly 52 and the motor 94 exceeds a preset limit.

Motor assembly 92 is preferably an AC brushless motor, such as for example, model number 11260 available from Anchuan Dadao Electrical Technology Co., Ltd, located at Fenghua City, Ningbo, China. Use of an AC motor serves to reduce the weight of the power head 54. The motor assembly 92 includes an internal planetary gear transmission coupled directly to the motor. Consequently, the present power head 54 provides a direct drive system for the auger assembly 52. In one embodiment, the transmission has a gear ratio of about 18.27:1, which provides an output of 208 RPM (revolutions per minute) at or motor speed of 3800 RPM.

The battery pack 70 is a 36 volt, 3 ampere-hour lithium ion battery. A suitable battery pack 70 is available from Ningbo Lera Electric Appliance Co., Ltd., located at Fenghua, China under model number 11251. The battery pack 70 preferably includes an automatic low-power shut-off, such as a logical switch that cuts off the power flow if the voltage of the battery 70 drops below a certain voltage level, such as for example about 32 volts. The battery pack 70 also preferably includes a thermal cut-out switch that terminates the flow of power if the battery temperature exceeds a predetermined threshold.

The removable battery pack 70 is typically removed from the electric auger 50 for charging. For cold weather applications, such as ice fishing, the battery pack 70 can be kept in a warm location until needed in order to better maintain the charge. For more demanding projects multiple pre-charged battery packs can be 70 used.

Controller 100 is electrically interposed between the battery pack 70 and the motor assembly 92 to provide a variety of functions. Trigger assembly 78 includes electrical switch 102 that is electrically coupled to the controller 100. The controller 100 includes a direct-to-alternating (D-to-A) inverter that converts the 36 volt direct current output from the battery pack 70 to 36 volt, 120 Hz alternating current required by the motor 92.

The controller 100 is programmed to monitor voltage and amperage levels, battery temperature, motor temperature, and torque. In one embodiment, motor torque is calculated based on voltage and/or amperage. The controller 100 is programmed to stop the motor 92 if torque, current, or temperature exceeds predetermined thresholds, and if voltage drops below a predetermined threshold. A suitable controller is available from Ningbo Lera Electric Appliance Co., Ltd., located at Fenghua, China under model number 11259.

In another embodiment, the controller 100 is programmed with a built-in delay between activation of the switch 102 and activation of the motor 92. The delay, also known as a soft start, reduces current spikes during start-up, which saves on battery life. The soft start is also a safety feature in the event the trigger 78 is actuated inadvertently.

The configuration of the electric auger 50 noted above dramatically reduces the weight of the power head 54. Using the noted motor 92, battery pack 70, and controller 100 results in an overall weight of about 12 pounds. The power head 50 plus the auger assembly 52 weighs about 14 pounds. For example, the present power head 54 weighs about 45% less than the "Icegator Annihilator" power head noted above.

The ratio of volume of ice cut per battery ampere-hour per weight of the power head of the present ice auger is at least about 900 inches$^3$/ampere-hour/pounds, or about 1000 inches$^3$/ampere-hour/pounds, or about 1200 inches$^3$/ampere-hour/pounds. The ratio of volume of ice cut per battery ampere-hour per weight of the present ice auger is at least about 900 inches$^3$/ampere-hour/pounds, or about 1000 inches$^3$/ampere-hour/pounds, or about 1100 inches$^3$/ampere-hour/pounds.

FIGS. 4A through 4D illustrate more detail of the auger assembly 52. Cutting assembly 62 includes depth control ring 120 surrounding removable cutting blades 80. The control ring 120 regulates the cut rate of the blades 80 so as to not overburden the power head 54, while providing an acceptable cut rate. The depth control ring 120 also centers the auger assembly 52 in the hole during cutting.

The blades 80 extend beyond plane 122 of the depth control ring 120 to engage with the work surface. Notch 126 is provided in the depth control ring 120 allows chips or cut material to flow away from the blades 80 and into engagement with the helical flights 56. The auger assembly 52 typically has an overall length 128 of about 36 inches, with extension available in 12 inch increments.

The cut rate of the present cutting assembly 62 is preferably tuned to correspond to the optimum power output of the power head 54. Other variables used to tune the cutting assembly 62 are the diameter of the control ring 120, bevel 130 on the cutting blades 80 (see FIG. 5A), the angle of attack of the cutting blades 80 relative to plane 122 of the control ring 120, length of 132 of cutting edge 124 (see FIG. 5B). As used herein, "cutting assembly variables" refers to variable used to control the cut rate and cutting torque for a cutting assembly to cut a given material.

The cutting assembly variable determine, in part, the cutting torque required to turn the auger assembly 52 at the preferred operating speed when engaged with the work surface. The cutting torque is preferably tuned to match the operating torque of the power head 54. The tuning process involves matching the rate of rotation of the drive shaft 68 and the operating torque produced by the motor 92 to the cutting torque required to turn the cutting assembly 62 on a given surface. In order maximize battery lift, the motor 92 is preferably operated at 80% of maximum torque. For example, if the maximum torque is 150 inch pounds, the operating torque is 120 inch pounds.

For example, for a power head 54 with an operating torque of 120 inch pounds and a control ring diameter of 8 inches configured for cutting ice, the blades 80 extend about 0.34 inches below the plane 122 at an angle of about 14 degrees and have a cutting edge 124 of 3.5 inches long per blade. The bevel 130 on the cutting blades 80 is 54 degrees into 24.3 degrees. These cutting assembly variables provide a cut rate of 75 inches/minute and can cut 800 inches of ice on a single charge.

EXAMPLE

The volume of ice cut per battery ampere-hour per weight of the present ice auger described above was compared to the Icegator Annihilator ice auger sold by Icegator, LLC. The ratio of ice cut per battery ampere-hour per weight was selected to capture the cutting capacity as a function of weight.

The present ice auger included an A/C brushless motor with an internal direct drive planetary gear transmission, sold as model number 11260 by Anchuan Dadao Electrical Technology Co., Ltd, located at Fenghua City, Ningbo, China. The battery pack was a 36 volt, 3 ampere-hour lithium ion battery available from Ningbo Lera Electric Appliance Co., Ltd., located at Fenghua, China under model number 11251. An ampere-hour or amp-hour is a unit of electric charge that specifies the quantity of electricity that flows in one hour through a conductor carrying a current of one ampere. The controller included a direct-to-alternating (D-to-A) inverter that converted the 36 volt direct current output from the battery pack to 36 volt, 120 Hz available from Ningbo Lera Electric Appliance Co., Ltd., located at Fenghua, China under model number 11259.

The test conditions included no down force applied to the auger during drilling other than the weight of the auger itself. The test drilling was conducted in fresh water lake ice at an outside air temperature below about 25 degrees F. for at least about 24 hours before and during testing. The ice was substantially free from layering that occurs when the top surface melts and refreezes. Testing occurred at an elevation of less than about 2,000 feet above sea level.

The total ice thickness was between about 20 and about 30 inches (not including snow cover). There was less than about 6 inches of average snow cover. The snow was not removed from test area.

As shown in Table 1 below, the present ice auger cut 40 holes having an 8 inch diameter through 24 inches (960 inches) of ice on one charge from a 3 ampere-hour battery. The performance of the Ice Annihilator was calculated using the Eskimo brand 8 inch hand auger coupled to the Ice Annihilator power head.

The performance was compare for both the power heads and for the power heads plus the drill, using the formula: $R=[(D^2*\pi/4)*T/A]/W$, where D=hole diameter in inches
T=total inches of ice drilled
A=Ampere-hour of battery
W=Weight of power head only
Q=Weight of entire auger
R1=Volume of ice cut per battery ampere-hour per weight (power head only)
R2=Volume of ice cut per battery ampere-hour per weight (power head+drill)

TABLE 1

| Description | Variable | Present Ice Auger | Icegator Ice Annihilator | Units |
|---|---|---|---|---|
| hole diameter in inches | D | 8 | 8 | inches |
| total inches of ice drilled | T | 960 | 960 | inches |
| ampere-hour of battery | A | 3 | 3 | Amp*hr |
| weight of power head only | W | 12 | 23 | lb |
| weight of entire auger | Q | 14 | 31 | lb |
| Volume of ice cut per battery ampere-hour/weight (power head only) | R1 | 1340.41 | 699.35 | in^3/(amp*hr)/lb |
| Volume of ice cut per battery ampere-hour/weight (power head + drill) | R2 | 1148.93 | 518.87 | in^3/(amp*hr)/lb |

When comparing just the power heads, the present ice auger exhibits a volume of ice cut (cubic inches) per battery ampere-hour per weight in pounds that is 91.7% greater than the Icegator Annihilator. When comparing the power heads plus the drill, the present ice auger exhibits a volume of ice cut (cubic inches) per battery ampere-hour per weight in pounds that is 121.5% greater than the Icegator Annihilator. In short, the present ice auger cuts about 100% more ice per battery ampere-hour per weight of the ice auger/power head than the Icegator Annihilator.

The description provided herein is made with particular reference to an electric augers for cutting holes in ice. However, an ordinarily skilled artisan appreciate that the present electric auger can also be used to drill holes for a variety of purposes. For example, the present electric auger can be used to drill holes in the ground, such as for setting posts (e.g. a fence post), or other situations where a narrow hole is advantageous. A typical auger hole is four to twelve inches in diameter.

Where a range of values is provided, it is understood that each intervening value, to the tenth of the unit of the lower limit unless the context clearly dictates otherwise, between the upper and lower limit of that range and any other stated or intervening value in that stated range is encompassed within the embodiments of the disclosure. The upper and lower limits of these smaller ranges which may independently be included in the smaller ranges is also encompassed within the embodiments of the disclosure, subject to any specifically excluded limit in the stated range. Where the stated range includes one or both of the limits, ranges excluding either both of those included limits are also included in the embodiments of the present disclosure.

Unless defined otherwise, all technical and scientific terms used herein have the same meaning as commonly understood by one of ordinary skill in the art to which the embodiments of the present disclosure belong. Although any methods and materials similar or equivalent to those described herein can also be used in the practice or testing of the embodiments of the present disclosure, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present disclosure is not entitled to antedate such publication by virtue of prior invention. Further, the dates of publication provided may be different from the actual publication dates which may need to be independently confirmed.

Other embodiments of the disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of the present disclosure. It should be understood that various features and aspects of the disclosed embodiments can be combined with or substituted for one another in order to form varying modes of the disclosed embodiments of the disclosure. Thus, it is intended that the scope of the present disclosure herein disclosed should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment(s) that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

What is claimed is:

1. An electric auger comprising:
   an auger assembly comprising a coupling assembly at a proximal end, a cutting assembly having at least one cutting blade located at a distal end, and a helical flight located between the proximal end and the distal end;
   a power head comprising;
      an A/C motor with a drive shaft configured to mechanically couple with the proximal end of the auger assembly;
      an on-board 36-volt DC battery pack;
      a thermal cut-out switch that terminates power flow to the A/C motor if battery temperature exceeds a pre-determined threshold; and
      a controller including an inverter that converts DC power to A/C power for the A/C motor,
   wherein a ratio of cubic inches of ice cut per battery ampere-hour per weight in pounds of the electric auger is at least about 1200 (inches$^3$/ampere-hour/pounds).

2. The electric ice auger of claim 1 wherein the power head and battery pack weighs about 12 pounds.

3. The electric auger of claim 1 comprising a weight of about 14 pounds.

4. The electric auger of claim 1 wherein the battery pack is removable.

5. The electric auger of claim 1 comprising a direct drive system coupling the A/C motor to the auger assembly.

6. The electric auger of claim 5 wherein the direct drive system comprises a planetary gear transmission.

7. The electric auger of claim 1 comprising a program configured to stop the A/C motor if torque, current, or temperature exceeds predetermined thresholds.

8. The electric auger of claim 1 comprising a program configured to create a delay between activation of a power switch and activation of the A/C motor.

9. The electric auger of claim 1 wherein the controller regulates operation of the A/C motor to provide a maximum torque and an operating torque.

10. The electric auger of claim 1 wherein the ratio of cubic inches of ice cut per battery ampere-hour per weight in pounds of the electric auger is at least about 1000 (inches$^3$/ampere-hour/pounds).

11. The electric auger of claim 1 wherein the ratio of cubic inches of ice cut per battery ampere-hour per weight in pounds of the power head is at least about 900 (inches$^3$/ampere-hour/pounds).

12. An electric power head for rotating an auger assembly of an ice auger, the electric power head comprising:
   an A/C motor with a drive shaft configured to mechanically couple with the auger assembly;
   an on-board 36-volt DC battery pack;
   a thermal cut-out switch that terminates power flow to the A/C motor if battery temperature exceeds a predetermined threshold; and
   a controller including an inverter that converts DC power to A/C power for the A/C motor,
   wherein a ratio of cubic inches of ice cut per battery ampere-hour per weight in pounds of the electric power head is at least about 900 (inches$^3$/ampere-hour/pounds).

13. The electric auger of claim 12 wherein the ratio of cubic inches of ice cut per battery ampere-hour per weight in pounds of the power head is at least about 1200 (inches$^3$/ampere-hour/pounds).

14. A method of operating an electric auger, the method comprising the steps of:
   attaching an auger assembly to a drive shaft of an A/C motor located in a power head;
   converting power from a 36-volt, on-board DC battery pack to 36 volt, 120 Hz alternating current;
   powering the A/C motor in the power head with the 36 volt, 120 Hz alternating current;
   terminating power flow to the A/C motor if battery temperature exceeds a predetermined threshold; and
   engaging at least one rotating cutting blade located at a distal end of the auger assembly with ice, wherein a ratio of cubic inches of ice cut per battery ampere-hour per weight in pounds of the electric auger is at least about 900 (inches$^3$/ampere-hour/pounds).

15. The method of claim 14 comprising directly coupling the A/C motor to the auger assembly.

16. The method of claim 14 comprising stopping the A/C motor if torque, current, or temperature exceeds predetermined thresholds.

17. The method of claim 14 comprising creating a delay between activation of a power switch and activation of the A/C motor.

18. The method of claim 14 comprising regulating operation of the A/C motor to provide a maximum torque and an operating torque.

\* \* \* \* \*